US012576375B2

(12) United States Patent (10) Patent No.: US 12,576,375 B2
Sadr (45) Date of Patent: Mar. 17, 2026

(54) STATIC MIXER FOR BLENDING FLUIDS WITH MELT

(71) Applicant: MARKDOM INTERNATIONAL INC., Toronto (CA)

(72) Inventor: Changize Sadr, Toronto (CA)

(73) Assignee: MARKDOM INTERNATIONAL INC., Toronto (CA)

( * ) Notice: Subject to any disclaimer, the term of this patent is extended or adjusted under 35 U.S.C. 154(b) by 755 days.

(21) Appl. No.: 17/966,312

(22) Filed: Oct. 14, 2022

(65) Prior Publication Data

US 2023/0120659 A1 Apr. 20, 2023

Related U.S. Application Data

(60) Provisional application No. 63/255,993, filed on Oct. 15, 2021.

(51) Int. Cl.
| | |
|---|---|
| *B01F 33/00* | (2022.01) |
| *B01F 23/232* | (2022.01) |
| *B01F 23/40* | (2022.01) |
| *B01F 23/45* | (2022.01) |
| *B01F 25/432* | (2022.01) |
| *B01F 25/433* | (2022.01) |
| *B01F 33/82* | (2022.01) |
| *B29C 45/18* | (2006.01) |
| *C08J 3/20* | (2006.01) |
| *B01F 101/00* | (2022.01) |

(52) U.S. Cl.
CPC .......... *B01F 33/821* (2022.01); *B01F 23/232* (2022.01); *B01F 23/45* (2022.01); *B01F 23/482* (2022.01); *B01F 25/4323* (2022.01); *B01F 25/4334* (2022.01); *B29C 45/1816* (2013.01); *C08J 3/201* (2013.01); *B01F 2101/2805* (2022.01); *B01F 2215/0422* (2013.01)

(58) Field of Classification Search
CPC .. B01F 33/821; B01F 25/4323; B01F 23/482; B01F 25/4334; C08J 3/201
See application file for complete search history.

(56) References Cited

U.S. PATENT DOCUMENTS

| | | | |
|---|---|---|---|
| 3,404,869 A | 10/1968 | Harder | |
| 4,198,168 A * | 4/1980 | Penn | B01F 25/4323 |
| | | | 366/336 |
| 5,297,948 A | 3/1994 | Sadr | |

* cited by examiner

*Primary Examiner* — Anshu Bhatia

(57) ABSTRACT

A static homogenizing apparatus for blending a fluid additive with a polymer melt includes: (a) a homogenizing conduit; and (b) a plurality of homogenizing elements in the conduit for flow of the melted resin and fluid additive through the homogenizing elements in series. The plurality of homogenizing elements includes a plurality of mixing elements and at least one amplifier element. Each mixing element has a quantity of mixing channels passing therethrough, and each amplifier element has a quantity of amplifier channels passing therethrough. The quantity of amplifier channels is greater than the quantity of mixing channels.

16 Claims, 4 Drawing Sheets

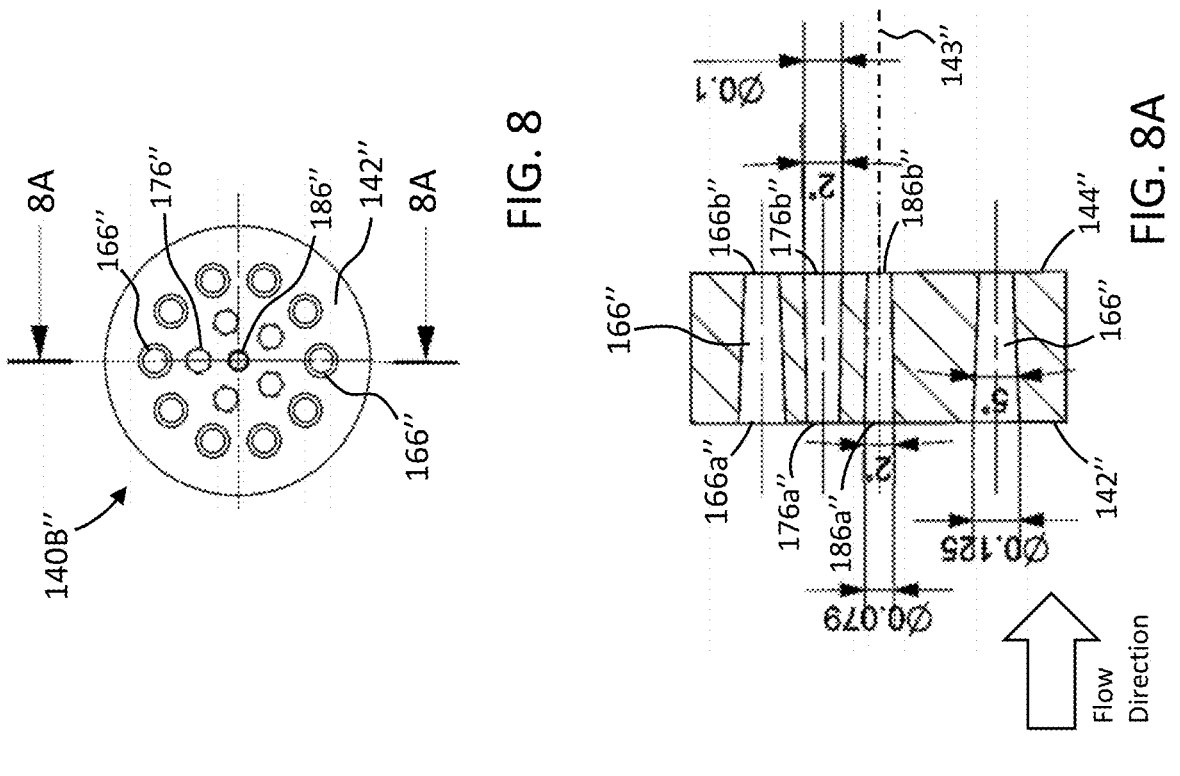
FIG. 7
FIG. 8
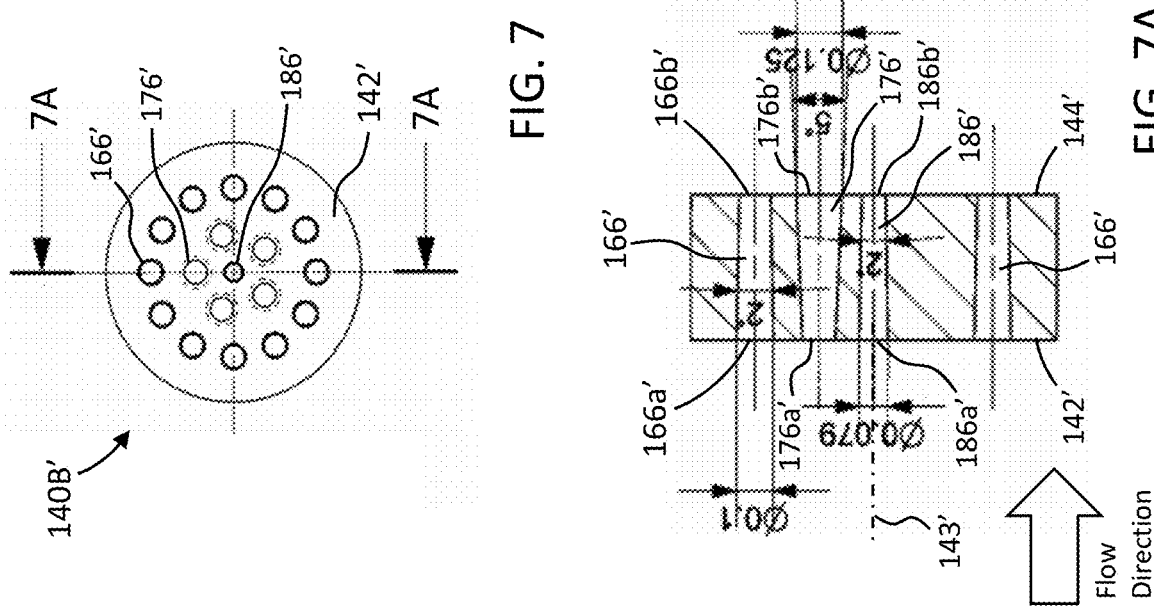
FIG. 7A
FIG. 8A

STATIC MIXER FOR BLENDING FLUIDS WITH MELT

CROSS-REFERENCE TO RELATED APPLICATIONS

This application claims the benefit of priority from U.S. Provisional Application No. 63/255,993, filed Oct. 15, 2021, which is hereby incorporated herein by reference in its entirety.

FIELD

The specification relates generally to injection molding, and more specifically, to mixing fluids with a melt for injection molding.

BACKGROUND

U.S. Pat. No. 3,404,869 (Harder) discloses a static mixer with a number of chambers having two or more inlets and two or more outlets, the inlets and outlets being non-coplanar and the planes intersecting an axis of flow. A number of such elements are series-connected to provide a mixer which creates layers within a stream and the mixing or layering action is independent of throughput below the region of turbulent flow.

U.S. Pat. No. 5,297,948 (Sadr) discloses that in production of foamed plastic articles using a screw extruder (extrusion molding), it is known to introduce a gaseous foaming agent into the plastic while the latter is passing through the extruder, and further discloses that a foamed thermoplastic with pores or cells of uniform size and distribution can be produced by passing a gaseous foaming agent, e.g. nitrogen gas through a central passage extending substantially the entire length of the extruder screw, discharging the agent into the thermoplastic proximate the discharge end of the extruder, and mixing the foaming agent with the plastic immediately prior to discharge of the mixture into a mold.

SUMMARY

The following summary is intended to introduce the reader to various aspects of the applicant's teaching, but not to define any invention.

According to some aspects, a static homogenizing apparatus for blending a fluid with a polymer melt, includes: a) a homogenizing conduit having an upstream end for receiving a non-homogenous aggregation of a melted resin and a fluid additive, and a downstream end opposite the upstream end; and b) a plurality of homogenizing elements disposed in the conduit for flow of the melted resin and fluid additive through the homogenizing elements in series from the upstream end to the downstream end, each homogenizing element having a rear face directed toward the upstream end and a front face directed toward the downstream end. The plurality of homogenizing elements includes i) at least two mixing elements, each mixing element having a plurality of mixing channels passing therethrough, each mixing channel having a mixing channel cross-sectional area and a mixing channel inlet in the rear face and a mixing channel outlet in the front face of the respective mixing element; and ii) at least one amplifier element, each amplifier element having a plurality of amplifier channels passing therethrough, the quantity of amplifier channels in each amplifier element greater than the quantity of mixing channels each amplifier channel having a minimum cross-sectional area defining an amplifier channel cross-sectional area of each amplifier channel, the amplifier channel cross-sectional area of each amplifier channel less than the mixing channel cross-sectional area, and each amplifier channel having an amplifier channel inlet in the rear face and an amplifier channel outlet in the front face of the respective amplifier element; wherein a homogenized solution of the melted resin and fluid additive is delivered from the downstream end of the homogenizing conduit.

According to some aspects, a static homogenizing apparatus for blending a fluid additive with a polymer melt, includes: (a) a homogenizing conduit having an upstream end for receiving a non-homogenous aggregation of a melted resin and a fluid additive, and a downstream end opposite the upstream end; and (b) a plurality of homogenizing elements disposed in the conduit for flow of the melted resin and fluid additive through the homogenizing elements in series from the upstream end to the downstream end, each homogenizing element having a rear face directed toward the upstream end and a front face directed toward the downstream end. The plurality of homogenizing elements includes at least two mixing elements, each mixing element having a quantity of mixing channels passing therethrough, the quantity of mixing channels being at least two, each mixing channel having a channel length extending from a mixing channel inlet in the rear face to a mixing channel outlet in the front face of the respective mixing element, wherein the melted resin and fluid additive upstream of each mixing element is divided into separate substreams corresponding to the quantity of mixing channels and recombined downstream of the respective mixing element for mixing. The plurality of homogenizing elements further includes at least one amplifier element, each amplifier element having a quantity of amplifier channels passing therethrough, the quantity of amplifier channels being greater than the quantity of mixing channels, each amplifier channel having an amplifier channel length extending from an amplifier channel inlet in the rear face and an amplifier channel outlet in the front face of the respective amplifier element. In use, a homogenized solution of the melted resin and fluid additive is delivered from the downstream end of the homogenizing conduit.

In some examples, each amplifier channel has tapered sidewalls to adjust a pressure drop across the amplifier channel length. In some examples, at least a first group of the amplifier channels comprises first channels that narrow in diameter from the amplifier channel inlet to the amplifier channel outlet for increasing the pressure drop across the amplifier channel length of the first channels. In some examples, at least a second group of the amplifier channels comprises amplifier second channels that widen in diameter from the amplifier channel inlet to the amplifier channel outlet, for reducing the pressure drop across the amplifier channel length of the amplifier second channels. In some examples, the amplifier first channels are arranged in a first circular array proximate an outer cylindrical sidewall of the amplifier element, and the amplifier second channels are arranged in a second circular array, radially intermediate the first circular array and the axis of the amplifier element.

In some examples, the fluid additive is a liquid, and the amplifier first channels have sidewalls that taper inwardly at a first taper angle small enough to induce a relatively small increase in the pressure drop across the first channels. In some examples, the first taper angle is about 2 degrees. In some examples, the second channels have sidewalls that taper outwardly at a second taper angle large enough to induce a relatively large decrease in the pressure drop across the second channels and to induce a relatively wide lateral dispersion of the stream exiting the second channels. In some examples, the second taper angle is at least about 5 degrees.

In some examples, the fluid additive is a gas, and the first channels have sidewalls that taper inwardly at a first taper angle large enough to induce a relatively large increase in the pressure drop across the first channels, to facilitate dissolving and/or entraining the gas in the melted resin. In some examples, the first taper angle is at least about 5 degrees. In some examples, the second channels have sidewalls that taper outwardly at a second taper angle small enough to induce a relatively small decrease in the pressure drop across the second channels. In some examples, the second taper angle is no greater than about 2 degrees.

According to some aspects, a static homogenizing apparatus for blending a fluid additive with a polymer melt includes: (a) a homogenizing conduit; and (b) a plurality of homogenizing elements disposed in the conduit for flow of melted resin and fluid additive through the homogenizing elements in series. The plurality of homogenizing elements include: (i) a plurality of mixing elements, each mixing element having a plurality of mixing channels passing therethrough for dividing a stream of the melted resin and fluid additive into corresponding substreams for recombination downstream of the mixing element. At least some of the mixing channels of each mixing element are inclined relative to each other to facilitate mixing of the substreams exiting the mixing channels. The plurality of homogenizing elements further include: (ii) at least one amplifier element, each amplifier element having a plurality of amplifier channels passing therethrough for dividing the stream of melted resin and fluid additive into corresponding substreams for recombination downstream of the amplifier element. Each amplifier channel has an amplifier channel length and a cross-sectional area tapering along the amplifier channel length for adjusting a pressure drop and fluid flow rate across the amplifier channel length.

In some examples, the amplifier channels extend generally parallel with each other.

In some examples, the plurality of amplifier channels includes a first group of amplifier first channels arranged in a first circular array proximate an outer cylindrical sidewall of the amplifier element, the cross-sectional area of each amplifier first channel decreasing in a downsteam direction to increase a pressure drop and flow rate across the amplifier channel length of each amplifier first channel. In some examples, the plurality of amplifier channels includes a second group of amplifier second channels arranged in a second circular array radially intermediate the first circular array and a conduit axis along which the conduit extends, the cross-sectional area of each amplifier second channel increasing in the downstream direction to decrease a pressure drop and fluid flow rate across the amplifier channel length of each amplifier second channel.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 7 is a front view of an alternate example of an amplifier element of FIG. 4;

FIG. 7A is a cross-sectional view of the amplifier element of FIG. 7, taken along the lines 7A-7A;

FIG. 8 is a front view of another alternate example of an amplifier element of FIG. 4; and FIG. 8A is a cross-sectional view of the amplifier element of FIG. 8, taken along the lines 8A-8A.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Figure 1:
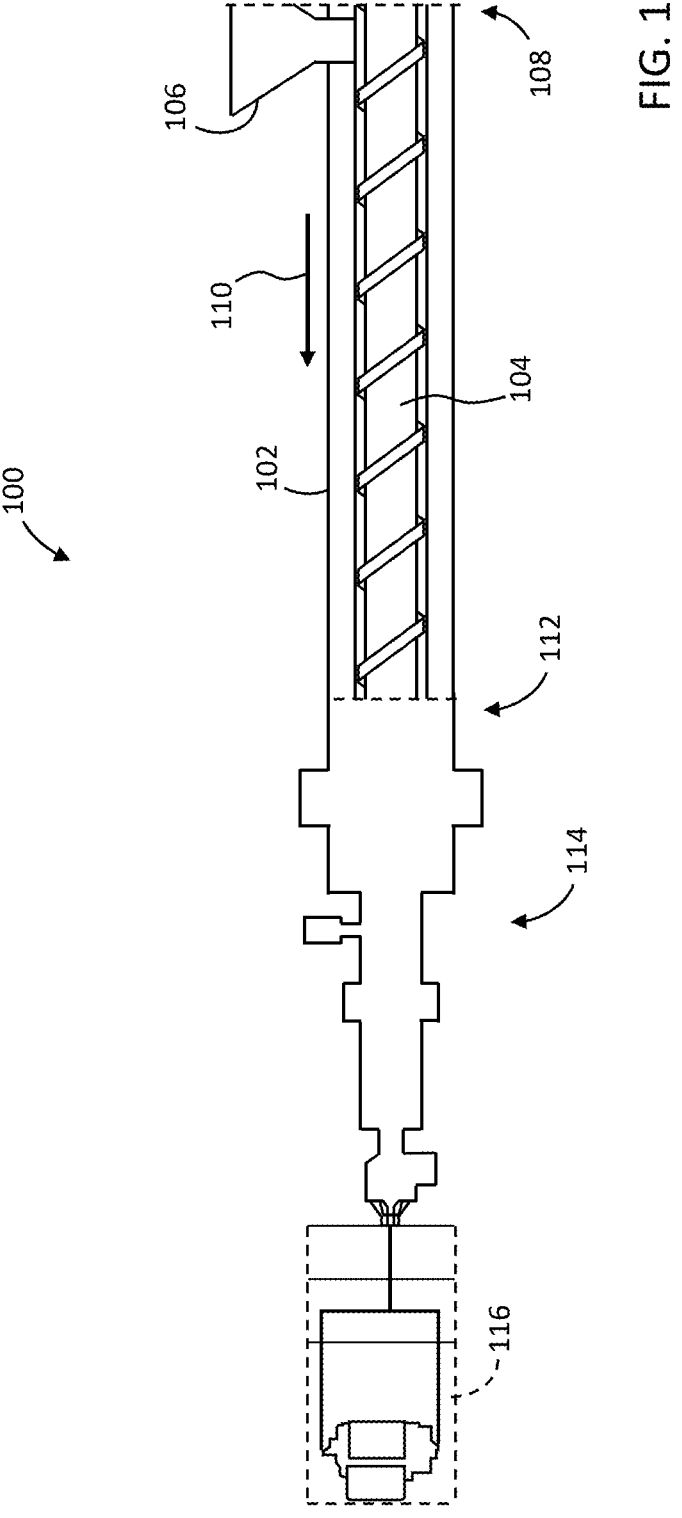
FIG. 1 is a schematic view of an injection unit in accordance with some aspects of the teaching disclosed herein.

Referring to FIG. 1, an injection unit 100 in accordance with some aspects of the teaching disclosed herein includes a barrel 102 and a plasticizing screw 104 inside the barrel 102. A hopper 106 is mounted toward a back end 108 of the barrel 102 for supplying raw material, such as plastic pellets, to the barrel. By rotating the screw and applying heat, the raw material is processed from solid (e.g. plastic pellets) to a melted resin (also referred to as the "melt"). Rotating the screw urges the processed material forward (in the direction of arrow 110) from the back end 108 toward a front end 112 of the barrel 102.

In the example illustrated, the injection unit 100 further includes a front section 114 extending forward of the front end 112 of the barrel 102. The front section 114 cooperates with the barrel 102 and screw 104 to inject the melt into a mold, such as, for example, mold 116. The front section 14 may also include structure for introducing another ingredient into the melt, and/or further mixing and blending the melt prior to injection into the mold 116.

Figures 2, 3:
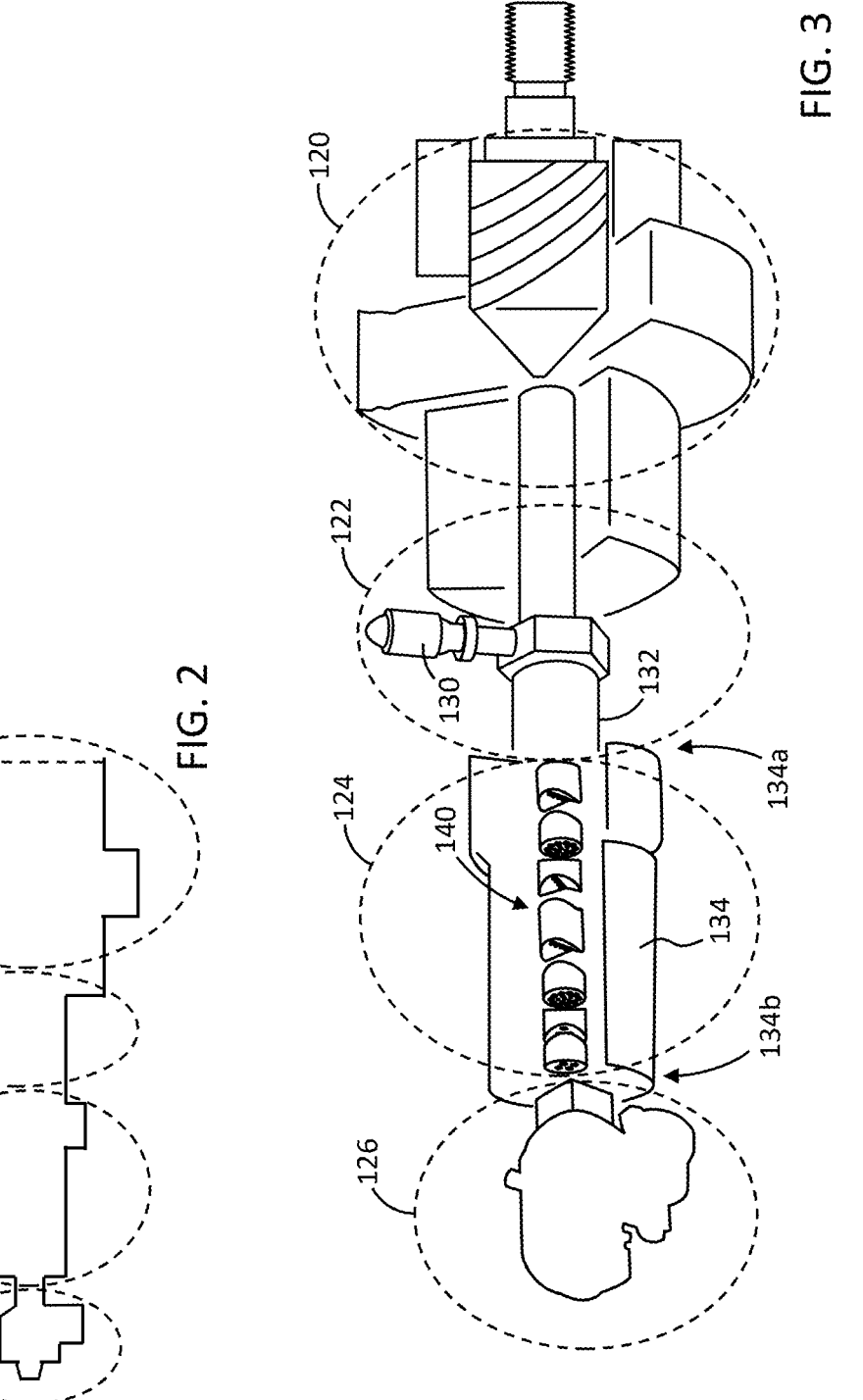
FIG. 2 is an enlarged schematic view of a portion of the injection unit of FIG. 1.
FIG. 3 is an enlarged view of FIG. 2 showing further details of structure previously shown schematically.

Referring now also to FIGS. 2 and 3, in the example illustrated, the front section 114 includes a rear seat closure 120 at a rear of the front section, an additive adaptor 122 forward of the rear seat closure 120, a static homogenizing apparatus 124 positioned forward of the additive adaptor, and a nozzle 126 positioned forward of the homogenizing apparatus 124 for injecting the melt into the mold 116.

The additive adapter 122 is configured to introduce an additive into the melt, downstream of the injection barrel 102. The additive can be an ingredient that changes one or more properties of the melt. In the example illustrated, the additive adapter 122 includes a fluid injector 130 for injecting a fluid additive (liquid or gas) into the melt as it passes through an adaptor conduit 132, downstream of the injection screw 104, and upstream of the homogenizing apparatus 124.

In some examples, the additive is a coloring agent that changes the color of the melt. In some examples, the additive is a blowing agent (such as a super critical fluid, e.g. nitrogen, carbon dioxide), that forms micro bubbles in the polymer (for production of microcellular foam molded articles).

Injecting the fluid additive into the adaptor conduit 132 produces a non-homogenous aggregation of melted resin and the fluid additive that flows out of the downstream end of the adaptor conduit 132.

Figures 4, 5, 6:
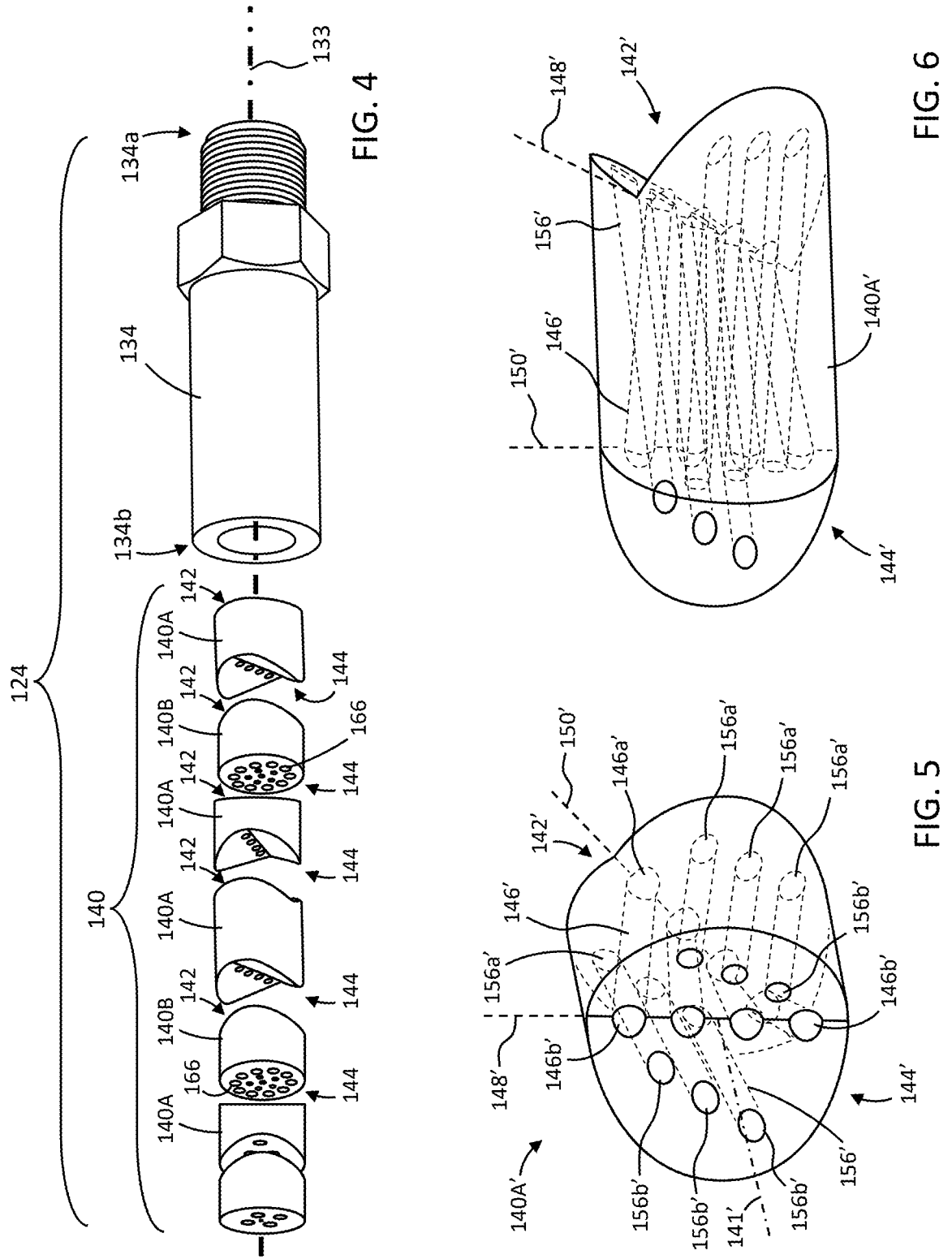
FIG. 4 is an exploded view of a portion of the structure of FIG. 3.
FIG. 5 is a front perspective view of an alternate example of a mixing element of FIG. 4.
FIG. 6 is a side view of the mixing element of FIG. 5.

With reference to FIGS. 3 and 4, the static homogenizing apparatus 124 has a homogenizing conduit 134 having an upstream end 134*a* for receiving the non-homogenous aggregation of melted resin and fluid additive from the adaptor conduit 132, and a downstream end 134*b* opposite the upstream end 134*a*.

The homogenizing apparatus 124 further includes a plurality of homogenizing elements 140 disposed in the homogenizing conduit 134 for flow of the melted resin and fluid additive through the homogenizing elements 140 in series from the upstream end 134*a* to the downstream end 134*b*. Each homogenizing element 140 has a rear face 142 directed toward the upstream end 134*a* and a front face 144 directed toward the downstream end 134*b*.

In the example illustrated, the plurality of homogenizing elements 140 includes at least two distinct types of homogenizing elements 140, namely, a first type of homogenizing element called a mixing element 140A, and a second type of homogenizing element called an amplifier element 140B.

In the example illustrated, the homogenizing apparatus 124 includes at least two mixing elements 140A. Each mixing element 140A has at least three mixing channels 146 passing therethrough. Each mixing channel is in the form of a cylindrical bore extending from a mixing channel inlet in the rear face 142 to a mixing channel outlet in the front face 144 of the mixing element 140A. In the example illustrated, each mixing element has four mixing channels 146. Each mixing channel 146 extends along a mixing channel axis, and the mixing channel axes of the mixing channels 146 are inclined (non-parallel) relative to one another. In the example illustrated, the mixing channel axes of the mixing channels 146 are also inclined (non-parallel) relative to the axis 133 of the homogenizing conduit 134.

Referring to FIGS. 5 and 6, another example of a mixing element 140A' has 4 mixing channels 146' ("core" mixing channels 146') passing therethrough. Each mixing channel 146' is in the form of a cylindrical bore extending from a mixing channel inlet 146*a'* in the rear face 142' to a mixing channel outlet 146*b'* in the front face 144' of the mixing element 140A. Each mixing channel 146' extends along a mixing channel axis, and the mixing channel axes of the mixing channels 146' are inclined (non-parallel) relative to one another. In the example illustrated, the mixing channel axes of the mixing channels 146' are also inclined (non-parallel) relative to the axis 133 of the homogenizing conduit 134 (and the axis 141' of the mixing element 140A'). Furthermore, the mixing channel inlets 146*a'* of the four core mixing channels 146' are aligned along a front face bisector 148' and the mixing channel outlets 146*b'* are aligned along a rear face bisector 150'. The front and rear bisectors 148', 150' are rotated relative to each other about the conduit axis 133, and correspondingly, the mixing channel outlets 146*b'* are rotated about the axis 133 relative to the mixing channel inlets 146*a'* to facilitate mixing and blending of the fluid additive with the melted resin as the material passes thought the homogenizing conduit 134.

Furthermore, in the example illustrated, the mixing element 140A' includes a plurality of peripheral mixing channels 156' disposed radially outward of the core mixing channels 146'. In the example illustrated, three peripheral mixing channels 156' are provided radially outwardly of one side of the core mixing channels 146' and another 3 peripheral mixing channels 156' are provided radially outwardly of the other side of the core mixing channels 146'. Each peripheral mixing channel 156' has a mixing channel outlet 156*b'* that is rotationally offset (about the mixing element axis 141'/conduit axis 133) relative to the mixing channel inlet 156*a'* of the peripheral mixing channel 156'. In the example illustrated, the mixing channel outlet 156*b'* is rotationally offset by about 15 degrees in a clockwise direction relative to the mixing channel inlet 156*a'*. The peripheral mixing channels 156' with rotationally offset outlets can help to induce spiral movement of the melt for an enhanced mixing effect.

Referring again to FIG. 4, the homogenizing apparatus 124 includes at least one amplifier element 140B. In the example illustrated, the homogenizing apparatus includes two amplifier elements 140B. The amplifier elements 140B are spaced apart from each other by at least one mixing element 140A, and in the example illustrated, are spaced apart by two mixing elements 140A. Each amplifier element 140B has a plurality of amplifier channels 166 passing therethrough. In the example illustrated, the amplifier channels 166 are greater in quantity than the mixing channels 146, 156 in the mixing elements 140A. In the example illustrated, the amplifier channels 166 are smaller in size (cross-sectional area) than the mixing channels 146, 156 in the mixing elements 140A. Each amplifier channel 166 extends between an amplifier channel inlet in the front face 144 and an amplifier channel outlet in the rear face 142 of the amplifier element 140B. In the example illustrated, each amplifier channel 166 extends along an amplifier channel axis parallel with the amplifier element axis/conduit axis 133. The amplifier channel outlet 166*b* is, in the example illustrated, axially aligned with the amplifier channel inlet 166*a* of each amplifier channel 166.

In some examples, the amplifier channels 166 are arranged in groups based on position and/or shape of the channels. In some examples, the amplifier channels have tapered sidewalls to adjust a pressure drop across the amplifier channel length, and/or to adjust the rate of dispersion of the stream of material when exiting the amplifier channel. This can help optimize mixing of the fluid additive with the resin. In some cases, as has been determined by the present inventor, the configuration of the tapered sidewalls can be optimized for differences in the fluid additive being mixed with the resin, including, for example, whether the fluid additive is a liquid or a gas.

In some examples, at least a first group of the amplifier channels comprises first channels that narrow in diameter from the amplifier channel inlet to the amplifier channel outlet for increasing the pressure drop across the amplifier channel length of the first channels.

In some examples, at least a second group of the amplifier channels comprises amplifier second channels that widen in diameter from the amplifier channel inlet to the amplifier channel outlet, for reducing the pressure drop across the amplifier channel length of the amplifier second channels. The amplifier first channels are, in some examples, arranged in a first circular array proximate an outer cylindrical sidewall of the amplifier element, and the amplifier second channels are arranged in a second circular array, radially intermediate the first circular array and the axis of the amplifier element.

Referring now to FIGS. 7 and 7A, another example of an amplifier element 140B' has a plurality of amplifier channels. In the example illustrated, the quantity of amplifier channels in the amplifier element 140B' is greater than the quantity of mixing channels in each mixing element. In the example illustrated, the amplifier element 140B' has 18 amplifier channels in total. In the example illustrated, the amplifier channels of the amplifier element 140B' are configured in a way that has been found to provide favorable results when the fluid additive is a liquid, for example, a liquid coloring agent.

More particularly, in the example illustrated, the amplifier channels of the amplifier element 140B' are arranged in a plurality of groups, including a first group of amplifier first channels 166', a second group of amplifier second channels 176', and, in the example illustrated, an optional amplifier third channel 186'. Each amplifier first channel 166' is formed as a bore having tapered sidewalls that narrow in diameter from the amplifier channel inlet 166a' to the amplifier channel outlet 166b' (i.e. a conically-shaped bore, with the amplifier channel inlet 166a' having a greater diameter than the amplifier channel outlet 166b'). The sidewalls of the amplifier first channel 166' taper inwardly at a first taper angle small enough to induce a relatively small increase in the pressure drop across the first amplifier channels 166'. In the example illustrated, the sidewalls of the amplifier first channels 166' are tapered inwardly at an included angle of about 2 degrees (tapered at about 1 degree relative to the channel axis 133). A plurality of the amplifier first channels 166' (specifically twelve channels 166' in the example illustrated) are arranged in a first circular array about the axis of the amplifier element 140B', proximate the outer cylindrical sidewall of the amplifier element 140B'.

Each amplifier second channel 176' is, in the example illustrated, also formed as a bore having tapered sidewalls, but that widen in diameter from the amplifier channel inlet 176a' to the amplifier channel outlet 176b' (i.e. a conically-shaped bore, with the amplifier channel inlet 176a' having a smaller diameter than the amplifier channel outlet 176b'). The sidewalls of the amplifier second channels 176' taper outwardly at a second taper angle large enough to induce a relatively large decrease in the pressure drop across the second channels 176' and to induce a relatively wide lateral dispersion of the stream exiting the second channels 176'. The taper angle is, in some examples, at least about 5 degrees (included angle). In the example illustrated, the sidewalls of the amplifier second channels 176' are tapered outwardly at an included angle of about 5 degrees (tapered at about 2.5 degrees relative to the channel axis). A plurality of the amplifier second channels 176' (specifically five channels 176' in the example illustrated) are arranged in a second circular array about the axis 143' of the amplifier element 140B', radially intermediate the first circular array and the axis 143' of the amplifier element 140B'. The amplifier second channel outlet 176b' has a diameter that, in the example illustrated, is greater than the diameter of the first channel inlet 166a', and more particularly, is greater by about 0.025 inches in the example illustrated.

An optional amplifier third channel 186' is located at the axis 143' of the amplifier element 140B', formed as a bore having tapered sidewalls, i.e. a conically-shaped bore, with the amplifier channel inlet 186a' having a greater diameter than the amplifier channel outlet 186b'. The diameter of the third amplifier channel inlet 186a' is, in the example illustrated, smaller than the diameter of the first amplifier channel inlet 166a'.

Referring to FIGS. 8 and 8A, another example of an amplifier element 140B" has a plurality of amplifier channels. In the example illustrated, the quantity of amplifier channels is greater than the quantity of mixing channels. In the example illustrated, the amplifier element 140B" has 16 amplifier channels in total. In the example illustrated, the amplifier channels of the amplifier element 140B" are configured in a way that has been found to provide favorable results when the fluid additive is a gas, for example, a nitrogen or carbon dioxide blowing agent.

In the example illustrated, the amplifier channels of the amplifier element 140B" are arranged in three groups, namely a first group of amplifier first channels 166", a second group of amplifier second channels 176", and an optional amplifier third channel 186".

Each amplifier first channel 166" is formed as a bore having sidewalls that taper inwardly at a first taper angle large enough to induce a relatively large increase in the pressure drop across the first channels 166", to facilitate dissolving and/or entraining the gas in the melted resin. In the example illustrated, the first taper angle is at least about 5 degrees (included angle). A plurality of the amplifier first channels 166" (specifically ten first channels 166" in the example illustrated) are arranged in a first circular array about the axis 143' of the amplifier element 140B", proximate the outer cylindrical sidewall of the amplifier element 140B'".

Each second group amplifier channel 176" is, in the example illustrated, also formed as a bore having tapered sidewalls that taper outwardly at a second taper angle small enough to induce a relatively small decrease in the pressure drop across the second channels 176". In the example illustrated, the second taper angle is no greater than about 2 degrees (included angle). Each amplifier channel inlet 176a" has a smaller diameter than the amplifier channel outlet 176b". A plurality of the amplifier channels 176" (specifically five channels 176" in the example illustrated) are arranged in a second circular array about the axis 143" of the amplifier element 140B", radially intermediate the first circular array and the axis 143" of the amplifier element 140B". The second amplifier channel outlet 176b" has a diameter that is, in the example illustrated, smaller than the diameter of the first channel inlet 166a", and more particularly, is smaller by about 0.025 inches in the example illustrated.

A third amplifier channel 186" is located at the axis 143" of the amplifier element 140B", formed as a bore having tapered sidewalls, i.e. a conically-shaped bore, with the amplifier channel inlet 186a" having a greater diameter than the amplifier channel outlet 186b". The third amplifier channel inlet 186a" is, in the example illustrated, smaller than the second amplifier channel outlet 176b".

In use, plastic pellets are fed into the hopper 106, and are ground and heated in the barrel 102 to produce a melted resin. The melted resin flows through the adaptor conduit 132, where a liquid additive is injected into the melt via injector 130, producing a non-homogenous aggregation of the melted resin and the fluid additive.

The non-homogenous aggregation is then urged through the static homogenizing apparatus 124, where, in the example illustrated, the stream is urged to flow in series through a first mixing element 140A, then a first amplifier element 140B, then through second and third mixing elements 140A, then through a second amplifier element 140B, and then through at least one more mixing element 140A.

The stream of material flowing through the mixing elements 140 is divided into a plurality of sub-streams which are reoriented (or layered) relative to each other when leaving each mixing element. The abutting faces of any two adjacent homogenizing elements are shaped to form a space between the faces, wherein the sub-streams exiting a mixing element are recombined. In mixing elements having the peripheral mixing channels 156', a spiral flow is induced in the stream leaving the mixing elements to further enhance the mixing and blending of the fluid additive with the resin melt. In the example illustrated, the mixing channel outlet of each mixing channel is circumferentially offset from the mixing channel inlet to facilitate inducing such spiral flow.

The stream of material passing through the amplifier elements is further separated into more, smaller sub-streams corresponding to the quantity of amplifier channels in the amplifier element. The tapered sidewalls of the amplifier channels, in the example illustrated, help to adjust a pressure drop across the amplifier channel length, and to facilitate dispersion upon exiting the channel outlets. This helps improve the mixing action, and can help dissolve the liquid additive in the resin melt, so that a homogenized solution of the melted resin and fluid additive is delivered from the downstream end of the homogenizing conduit.

The invention claimed is:

1. A static homogenizing apparatus for blending a fluid additive with a polymer melt, comprising:
   a) a homogenizing conduit having an upstream end for receiving a non-homogenous aggregation of a melted resin and a fluid additive, and a downstream end opposite the upstream end; and
   b) a plurality of homogenizing elements disposed in the conduit for flow of the melted resin and fluid additive through the homogenizing elements in series from the upstream end to the downstream end, each homogenizing element having a rear face directed toward the upstream end and a front face directed toward the downstream end, and the plurality of homogenizing elements including:
      i) at least two mixing elements, each mixing element having a quantity of mixing channels passing therethrough, the quantity of mixing channels being at least two, each mixing channel having a channel length extending from a mixing channel inlet in the rear face to a mixing channel outlet in the front face of the respective mixing element, wherein the melted resin and fluid additive upstream of each mixing element is divided into separate substreams corresponding to the quantity of mixing channels and recombined downstream of the respective mixing element for mixing; and
      ii) at least one amplifier element, each amplifier element having a quantity of amplifier channels passing therethrough, the quantity of amplifier channels being greater than the quantity of mixing channels, each amplifier channel having an amplifier channel length extending from an amplifier channel inlet in the rear face and an amplifier channel outlet in the front face of the respective amplifier element;
   wherein a homogenized solution of the melted resin and fluid additive is delivered from the downstream end of the homogenizing conduit, and wherein each amplifier channel has tapered sidewalls to adjust a pressure drop across the amplifier channel length, wherein at least a first group of the amplifier channels comprises first channels that narrow in diameter from the amplifier channel inlet to the amplifier channel outlet for increasing the pressure drop across the amplifier channel length of the first channel, and wherein at least a second group of the amplifier channels comprises amplifier second channels that widen in diameter from the amplifier channel inlet to the amplifier channel outlet, for reducing the pressure drop across the amplifier channel length of the amplifier second channels.

2. The apparatus of claim 1, wherein the amplifier first channels are arranged in a first circular array proximate an outer cylindrical sidewall of the amplifier element.

3. The apparatus of claim 2, wherein the amplifier second channels are arranged in a second circular array, radially intermediate the first circular array and an axis of the amplifier element.

4. The apparatus of claim 1, wherein the fluid additive is a liquid, and the amplifier first channels have sidewalls that taper inwardly at a first taper angle small enough to induce a relatively small increase in the pressure drop across the first channels.

5. The apparatus of claim 4, wherein the first taper angle is about 2 degrees.

6. The apparatus of claim 4, wherein the second channels have sidewalls that taper outwardly at a second taper angle large enough to induce a relatively large decrease in the pressure drop across the second channels and to induce a relatively wide lateral dispersion of the stream exiting the second channels.

7. The apparatus of claim 6, wherein the second taper angle is at least about 5 degrees.

8. The apparatus of claim 1, wherein the fluid additive is a gas, and the first channels have sidewalls that taper inwardly at a first taper angle large enough to induce a relatively large increase in the pressure drop across the first channels, to facilitate dissolving and/or entraining the gas in the melted resin.

9. The apparatus of claim 8, wherein the first taper angle is at least about 5 degrees.

10. The apparatus of claim 8, wherein the second channels have sidewalls that taper outwardly at a second taper angle small enough to induce a relatively small decrease in the pressure drop across the second channels.

11. The apparatus of claim 10, wherein the second taper angle is no greater than about 2 degrees.

12. The apparatus of claim 1, wherein the conduit extends along a conduit axis, and wherein the mixing channels are inclined relative to the conduit axis and the amplifier channels extend generally parallel with the conduit axis.

13. The apparatus of claim 1, wherein each mixing channel has a mixing channel cross-sectional area that is generally constant along the mixing channel length, and each amplifier channel has an amplifier channel cross-sectional area tapering along the amplifier channel length to adjust a pressure drop and flow rate across the amplifier channel length.

14. A static homogenizing apparatus for blending a fluid additive with a polymer melt, comprising:
   a) a homogenizing conduit extending along a conduit axis; and
   b) a plurality of homogenizing elements disposed in the conduit for flow of melted resin and fluid additive through the homogenizing elements in series, the plurality of homogenizing elements including:
      i) a plurality of mixing elements, each mixing element having a plurality of mixing channels passing therethrough for dividing a stream of the melted resin and fluid additive into corresponding substreams for recombination downstream of the mixing element, the mixing channels of each mixing element inclined relative to each other and the conduit axis to facilitate mixing of the substreams exiting the mixing channels; and ii) at least one amplifier element, each amplifier element having a plurality of amplifier channels passing therethrough for dividing the stream of melted resin and fluid additive into corresponding substreams for recombination downstream of the amplifier element, each amplifier channel having an amplifier channel length and a cross-sectional area tapering along the amplifier channel length for adjusting a pressure drop and fluid flow rate across the amplifier channel length, wherein the plurality of amplifier channels comprises a first group of amplifier first channels arranged in a first circular array proximate an outer cylindrical sidewall of the amplifier element, the cross-sectional area of each amplifier first channel decreasing in a downstream direction to increase a pressure drop and flow rate across the amplifier channel length of each amplifier first channel.

15. The apparatus of claim 14, wherein the amplifier channels extend generally parallel with the conduit axis.

16. The apparatus of claim 14, wherein the plurality of amplifier channels comprises a second group of amplifier second channels arranged in a second circular array radially intermediate the first circular array and the conduit axis, the cross-sectional area of each amplifier second channel increasing in the downstream direction to decrease a pressure drop and fluid flow rate across the amplifier channel length of each amplifier second channel.

* * * * *